US008357882B2

(12) United States Patent
Jones et al.

(10) Patent No.: US 8,357,882 B2
(45) Date of Patent: Jan. 22, 2013

(54) INDUCTION HEATED SERVER

(76) Inventors: Brian C. Jones, New Hartford, CT (US);
Glenn H. Goyette, Harwinton, CT (US);
Albert J. Beland, Stafford Springs, CT (US); Richard C. Runyan, Labadie, MO (US)

( * ) Notice: Subject to any disclaimer, the term of this patent is extended or adjusted under 35 U.S.C. 154(b) by 237 days.

(21) Appl. No.: 12/800,333

(22) Filed: May 13, 2010

(65) Prior Publication Data

US 2010/0294753 A1 Nov. 25, 2010

Related U.S. Application Data

(63) Continuation-in-part of application No. 12/010,768, filed on Jan. 30, 2008, now abandoned.

(51) Int. Cl.
*H05B 6/12* (2006.01)
(52) U.S. Cl. ........................................ 219/620; 126/400
(58) Field of Classification Search .................. 126/400; 220/912; 219/620, 621, 624; D7/402
See application file for complete search history.

(56) References Cited

U.S. PATENT DOCUMENTS

| 457,561 | A | * | 8/1891 | Kennedy | 219/628 |
|---|---|---|---|---|---|
| 4,567,877 | A | * | 2/1986 | Sepahpur | 126/246 |
| 5,786,643 | A | * | 7/1998 | Wyatt et al. | 219/621 |
| 6,188,053 | B1 | * | 2/2001 | Wyatt | 219/620 |
| 2003/0116560 | A1 | * | 6/2003 | Wyatt | 219/621 |
| 2009/0188909 | A1 | * | 7/2009 | Jones et al. | 219/621 |

* cited by examiner

*Primary Examiner* — N Drew Richards
*Assistant Examiner* — Grant Withers
(74) *Attorney, Agent, or Firm* — Carmody & Torrance LLP

(57) ABSTRACT

An induction heatable server comprises a base element having top and bottom elements, said bottom element having a peripheral wall defining an upwardly opening cavity in which are disposed a heat retentive disc and a ring member which is bonded to the peripheral wall. A top element extends over the ring member and seals the cavity. The top element and ring member are bonded to the peripheral wall of the bottom element to preclude moisture penetration into the cavity.

10 Claims, 16 Drawing Sheets

INDUCTION HEATED SERVER

CROSS REFERENCE TO RELATED APPLICATION

The present application is a continuation-in-part of Applicant's application Ser. No. 12/010,768, filed Jan. 30, 2008 now abandoned.

BACKGROUND OF THE INVENTION

The present invention relates to induction heated servers for heating and/or maintaining the temperature of food in serving plates placed thereon.

Food must be served at temperatures above 140° F. to maintain good taste and quality. This is a challenge in food service applications where meals are delivered to remote locations such as in hospitals and nursing homes. Meals are served on china plates or serving dishes in a central kitchen and then transported to patients in their rooms. To keep the food warm, the served food is placed on a special heated "base" or server and then covered with an insulated dome. Typically, the food temperature must be held above 140° F. for up to 1 hour.

The special base or server is itself heated by an electromagnetic induction process. The base assembly includes an encapsulated "load" or heat retentive disc which is (1) susceptible to electromagnetic excitation and converts electromagnetic energy into equivalent heat energy, and (2) desirably capable of storing both latent and sensible heat energy at temperatures in the range of 200° F. through 350° F. Prior to placing the food plate on the special base or server, the base is electromagnetically charged with a typical 60,000 joules (57 BTU) of energy. Typically, the charging power is 3,300 watts which is maintained over a typical charging time of 18 seconds. As the base is inductively heated, the load temperature increases to as high as 350° F. In the process the load stores latent heat energy within a relatively narrow temperature range, e.g., between 250° and 350° F.

The serving plate with the food thereon is placed on the server and the latent energy stored in the load is slowly transferred to the food by thermal conduction to maintain the food at an elevated temperature above 140° F. The driving force for the heat transfer is the difference in temperature between the load temperature and the food temperature.

Immediately after charging the server, the food is typically at a served temperature of 180° F., and the load may reach a maximum post-charging internal temperature as high as 350° F. At the end of 1 hour, the food temperature and load temperature fall to about 140° F. Thus the rate of heat transfer into the food zone is greatest within a few minutes after charging the base when the temperature difference between the load and the food is greatest. As heat is gradually transferred to the ambient environment through the base and dome cover, the latent energy in the load becomes depleted and the load temperature begins to fall along with the food temperature.

Current server technology is exhibited by the serving system sold by Dinex International Corporation under the designation Model 511 Smart Therm™. The server or base assembly consists of two molded synthetic resin elements—upper and lower. The load and insulation layer are sandwiched between the upper and lower elements which are ultrasonically welded to each other. The insulation on the bottom of the load substantially prevents heat loss through the bottom element and promotes heat flow from the load into the upper surface of the upper element. It is important to have intimate contact between the load and the inner surface of the upper element. The intimate contact promotes good thermal conduction between the load and the food zone above the upper plastic element. A radio frequency identification (RFID) tag can be incorporated to provide information to the induction charger to prevent overheating of the temperature of the server.

Aladdin employs technology in which the load is an inductively susceptible metal plate. A disadvantage of the Aladdin technology is that the thermal storage in the metal plate is 100 percent sensible heat and 0 percent latent storage. The Aladdin system is not capable of storing energy to the same level as the Dinex server without using a heavy and costly metal load that operates at temperatures in excess of 500° F. Because of the high temperature, air trapped inside the Aladdin server expands and creates a high internal pressure. High pressure will also be developed if water penetrates into the induction zone (when the server is washed) through a faulty perimeter seal. A pressure relief valve is provided to vent the high pressure air or moisture that, if not otherwise relieved, could create an unsafe condition. The reliability of the Aladdin system is diminished by failure of the pressure relief valve which itself can result in water infiltration during the washing process. The ability of the base to store heat at high temperature is greatly diminished once water enters into the induction zone because the water acts to remove heat and reduce temperature as heated steam escapes through the relief valve.

The 511 Dinex base design is inherently less sensitive to the effects of trapped air. Pressure increase is lessened because the Dinex latent heat load does not require very high temperatures as are required with the Aladdin metal plate load. Thus, a pressure relief valve is not required in the Dinex server.

However, the reliability of this Dinex server is compromised by the need to ultrasonically weld the upper and lower plastic elements together. Experience has shown that the weld seam is not reliable, and water can infiltrate the induction zone during washing when the seal is not 100 percent hermetic. After inductive charging, steam escapes through any perimeter leak, thereby venting heat to the atmosphere. When this happens, the server loses its ability to keep the food warm.

It is an object of the present invention to provide a novel server construction which effectively precludes water infiltration into the server.

It is also an object to provide such a server which eliminates the need for welding the two elements.

Another object is to eliminate or minimized trapped air inside the server to preclude the creation of high internal pressure and resultant mechanical deformation of the server when inductively heated.

Another object of the present invention is to provide such server that reduces heat losses to the atmosphere and maximize heat transfer into the food zone.

Another object is to provide such a server which is readily fabricated and long lived.

A further object is to provide a novel method for fabricating an improved server which eliminates the need for welding top and bottom elements.

SUMMARY OF THE INVENTION

It has now been found that the foregoing and related objects may be readily attained in an induction heatable server comprising a bottom element having a bottom wall and a peripheral wall defining an upwardly opening cavity in which are disposed a heat retentive disc or load. A top element having a dependent peripheral flange extends over the heat retentive disc and seals the cavity. The base element is overmolded with resin about the heat retentive disc and has a generally horizontal flange which extends over a peripheral portion of the top element. As a result, the heat retentive disc is encapsulated and the top element is bonded to the peripheral wall of the base element to preclude moisture penetration into the cavity.

The preferred assembly includes a pre-molded ring member upon which the heat retentive disc and top element are seated.

Desirably, a layer of insulation is provided in the cavity below the heat retentive disc.

The ring member has a body portion and a depending leg portion with an inwardly extending flange at its lower end. The top element has a depending peripheral flange abutting the top and outer side surfaces of the ring member.

An RFID tag is sealed in a well in the lower surface of the bottom wall, and vermiculite is provided above the insulation to preclude flow of phase change material into the insulation. The ring member has an inwardly extending flange on which the insulation and disc are seated. The peripheral wall of the base element has an inwardly extending flange extending over a peripheral portion of the top element.

The heat retentive server is made by molding in a first mold cavity a generally disc-shaped top element with a depending peripheral flange. The ring member is made by molding in a second mold cavity. The top element and ring member along with heat retentive disc, vermiculite, insulation, and film are then mechanically fastened to form a sub-assembly. This sub-assembly is then placed into a third mold cavity into which molten resin is injected and overflows about the outer periphery and lower surface of the ring member and the top element to form an integral overmolded structure or shell with a top wall, bottom wall and sidewall.

DETAILED DESCRIPTION OF THE PREFERRED EMBODIMENT

Figure 1:
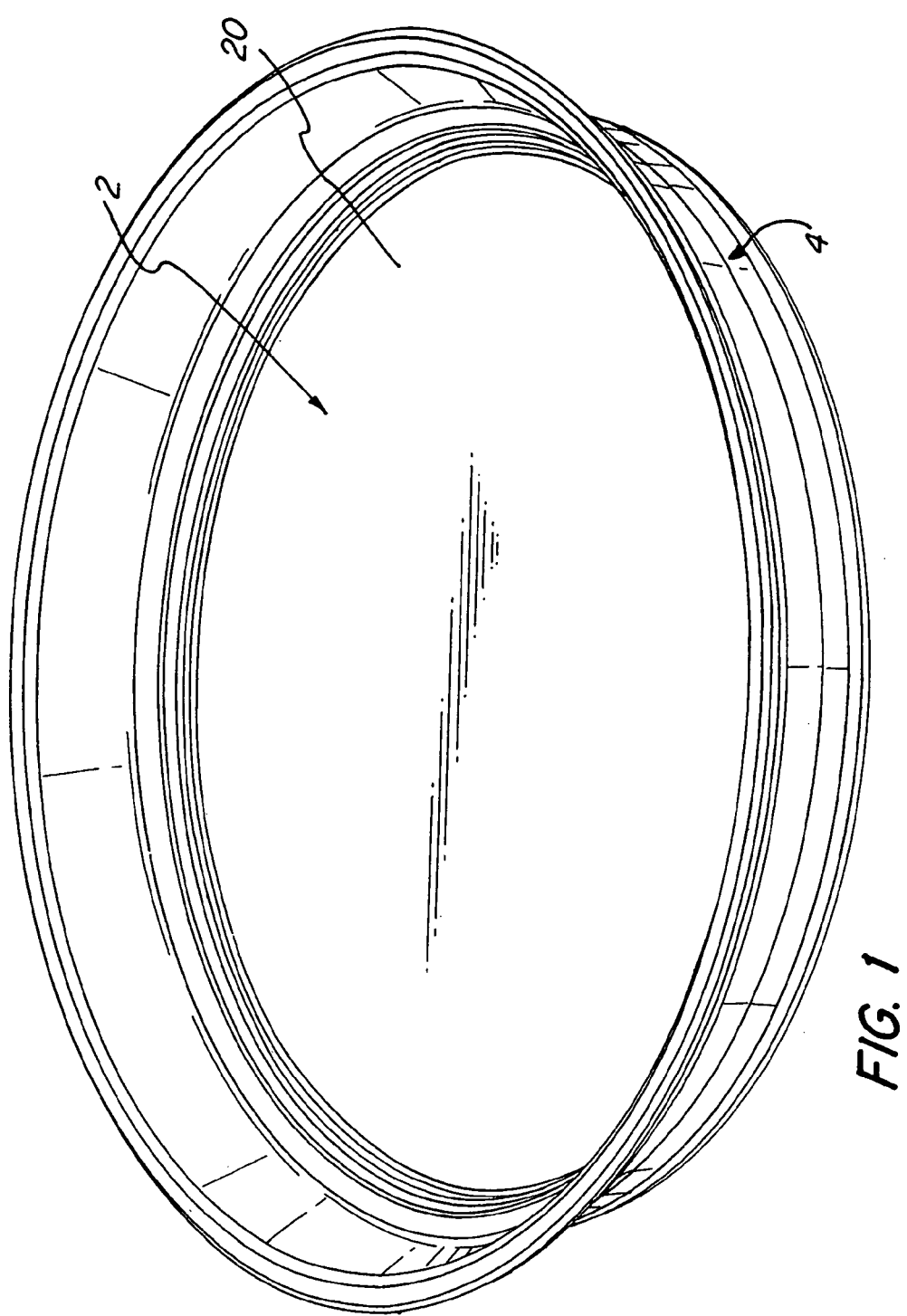
FIG. 1 is an isometric top view of a server embodying the present invention.
Figure 2:
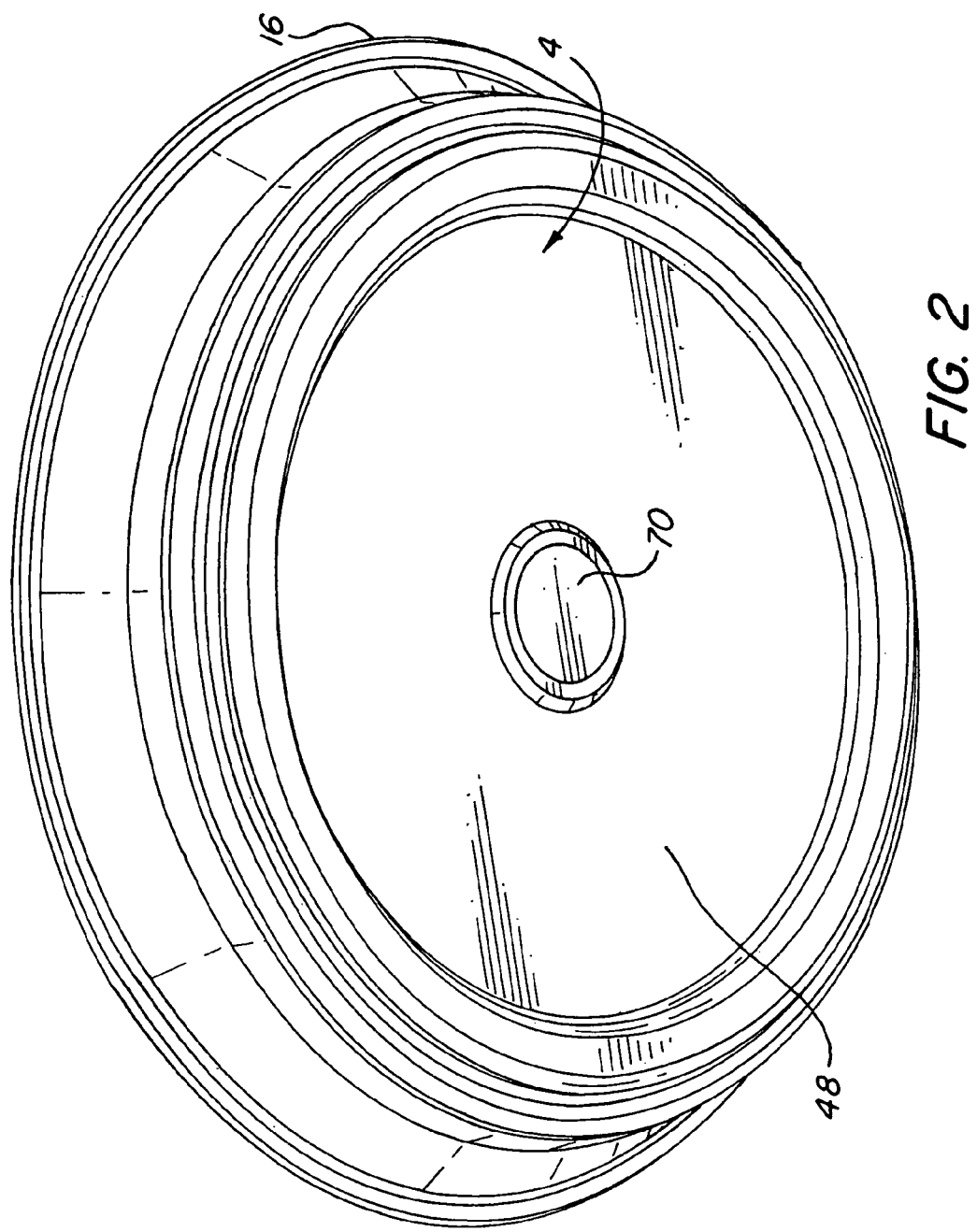
FIG. 2 is an isometric bottom near thereof.
Figure 3:
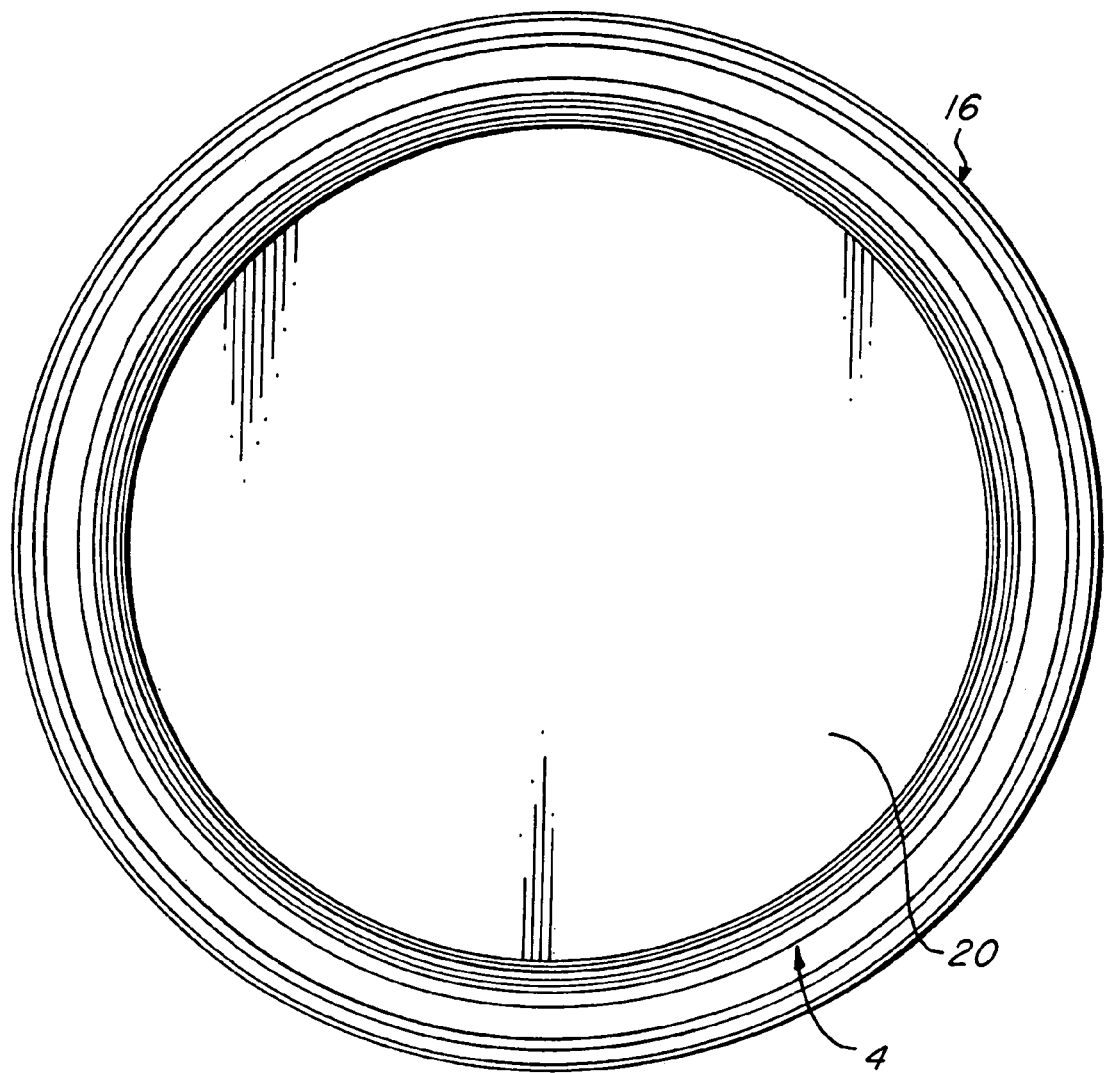
FIG. 3 is a top plan view thereof.

Turning first to FIGS. 1, 2, 6, 6A and 10, therein illustrated is a server embodying the present invention comprised of a top element generally designated by the numeral 2, a bottom element generally designated by the numeral 4, an RFID tag 68 seated in a well 66, and a cap 70 sealing the tag 68 in the well.

The components which are internal to the assembled top and bottom elements 2, 4 comprise a perimeter ring ("P-ring") 14, the disc or load 8, insulation 10, high temperature resin film 12, and a layer of vermiculite 22. These internal elements (and top element 2) are fastened as a sub-assembly which is placed collectively in a mold cavity. Molten resin is injected into the mold cavity to overmold the bottom element 4 and encapsulate the internal elements to bond to the top element 2 and P-ring 14.

The new induction heated server design and assembly process was developed to address the limitations of the current base technology. The new server encapsulates the load in an over molding process that eliminates the need to ultrasonically weld top and bottom pieces together. This results in a strong, consistent and highly reliable server that is impervious to water infiltration into the induction heating zone.

During the mold cycle, the mold machine operator assembles and places in a mold core a sub-assembly 6 that consists of the previously molded top element 2, the load disc 8, vermiculite 22, the insulation 10, the film 12, and a previously molded perimeter ring (P-ring) 14. The molten resin introduced in the mold cavity bonds to the top element 2 and the P-ring 14 and thereby forms the bottom element 4.

Figure 4:
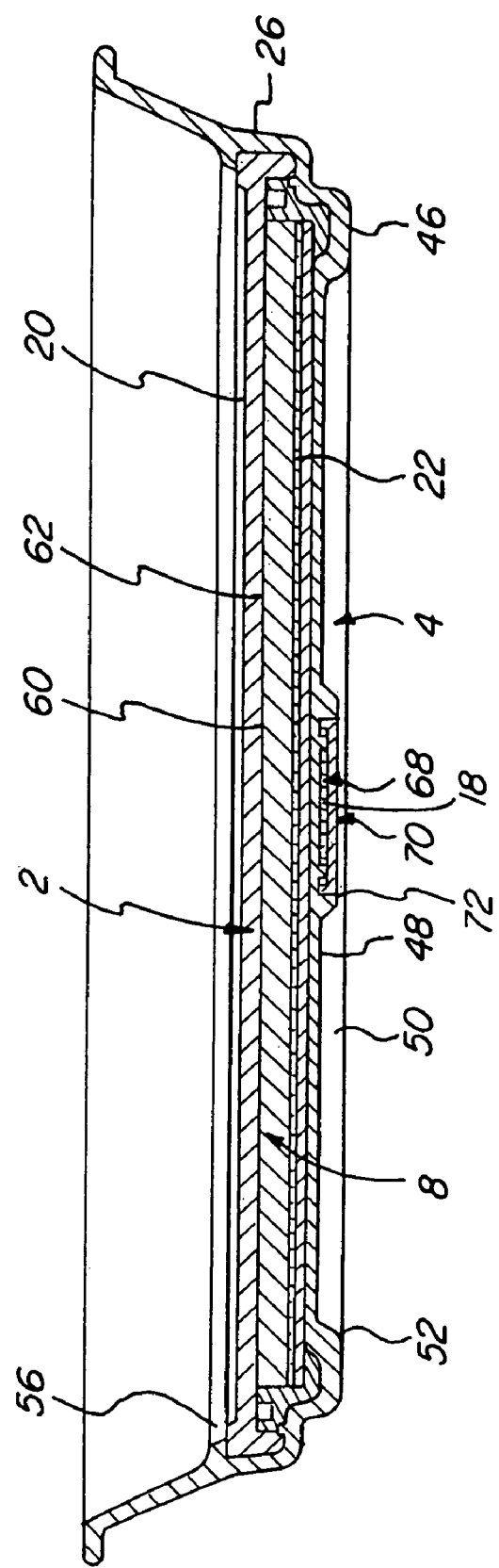
FIG. 4 is a transverse sectional view thereof.
Figure 5:
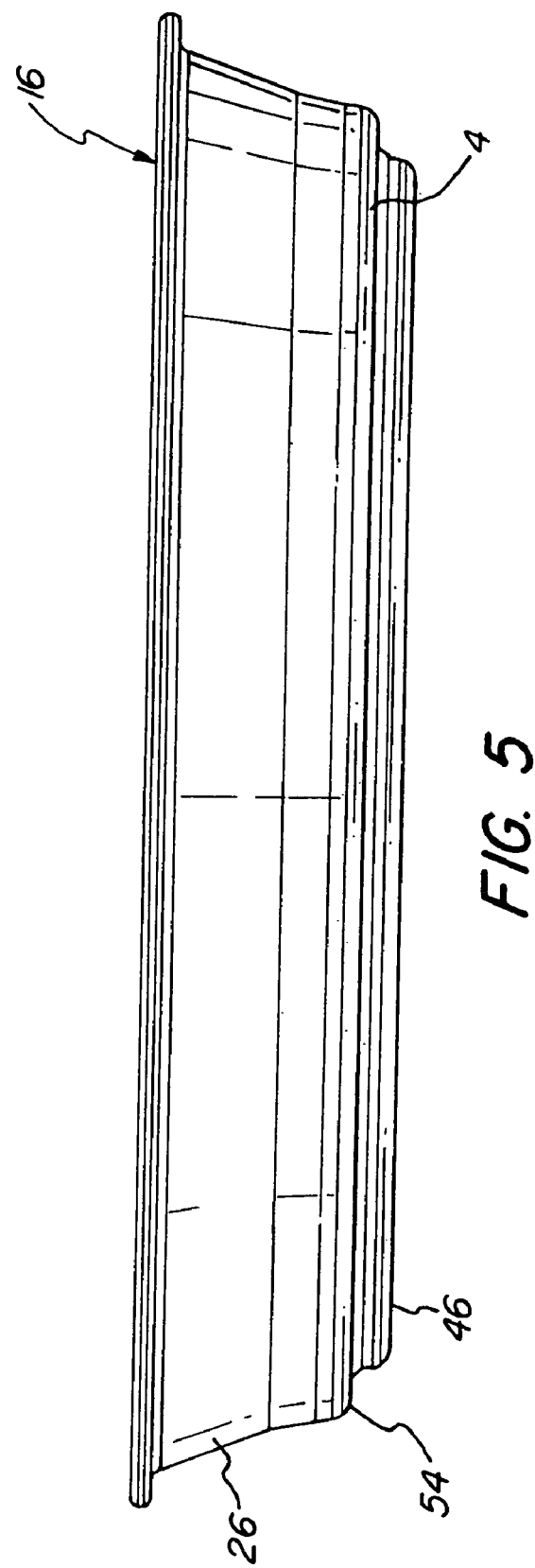
FIG. 5 is a side elevational view thereof.
Figure 6:
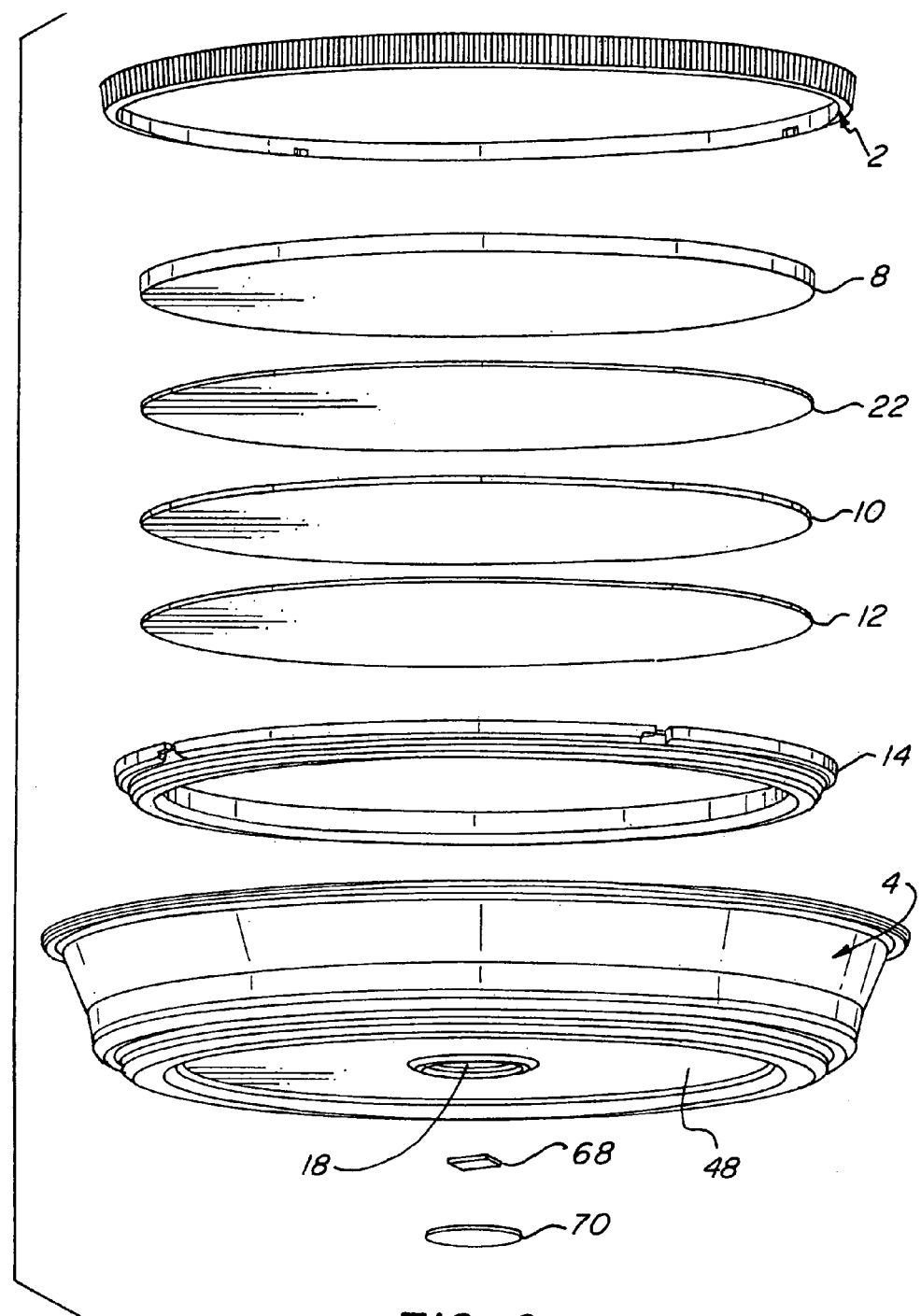
FIG. 6 is an exploded view thereof.
Figure 6A:
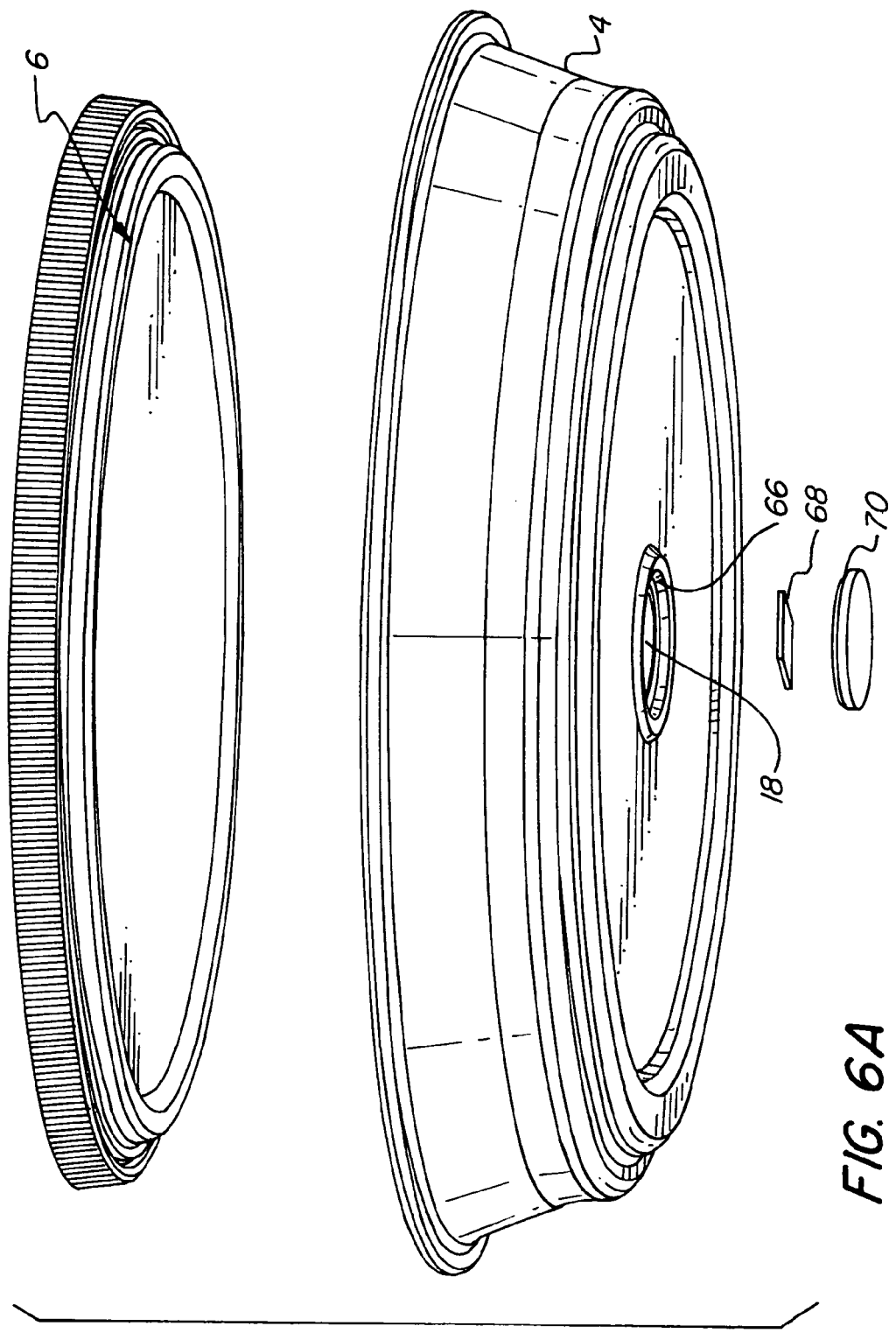
FIG. 6A is a partial by exploded view thereof.
Figure 7:
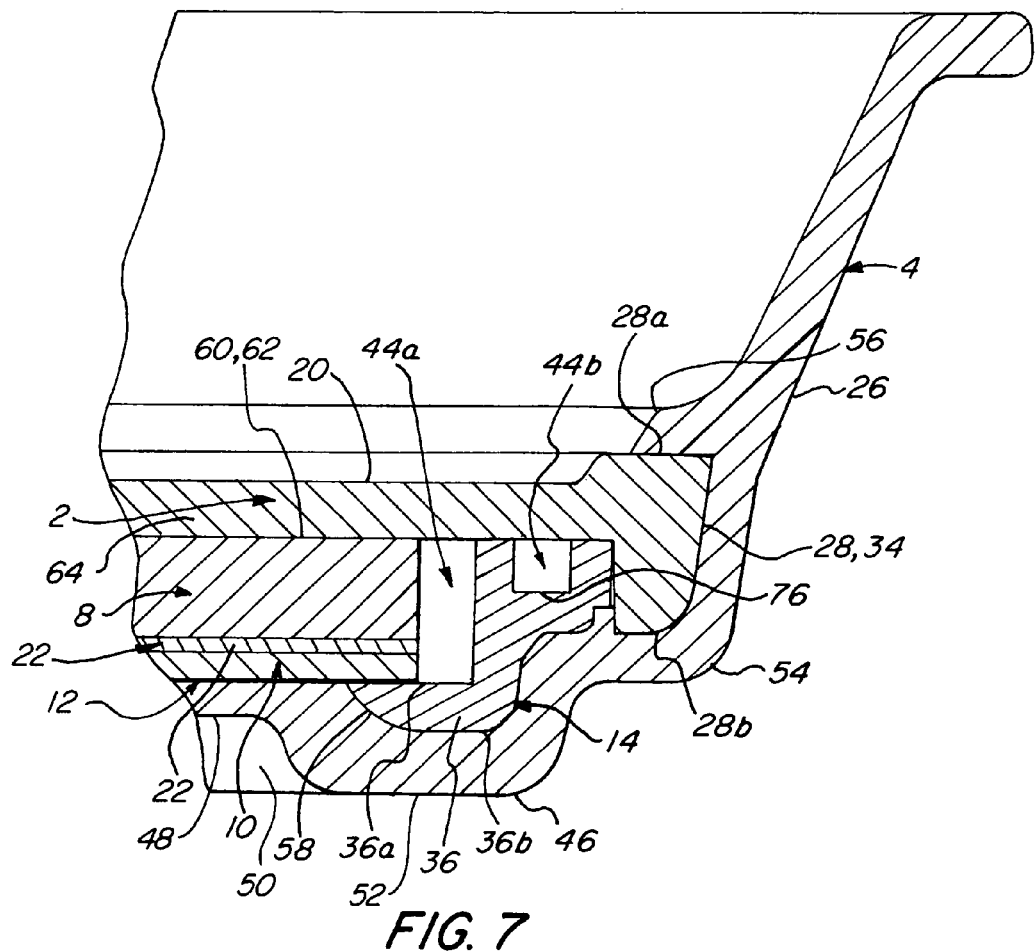
FIG. 7 is a fragmentary sectional view thereof.
Figure 8:
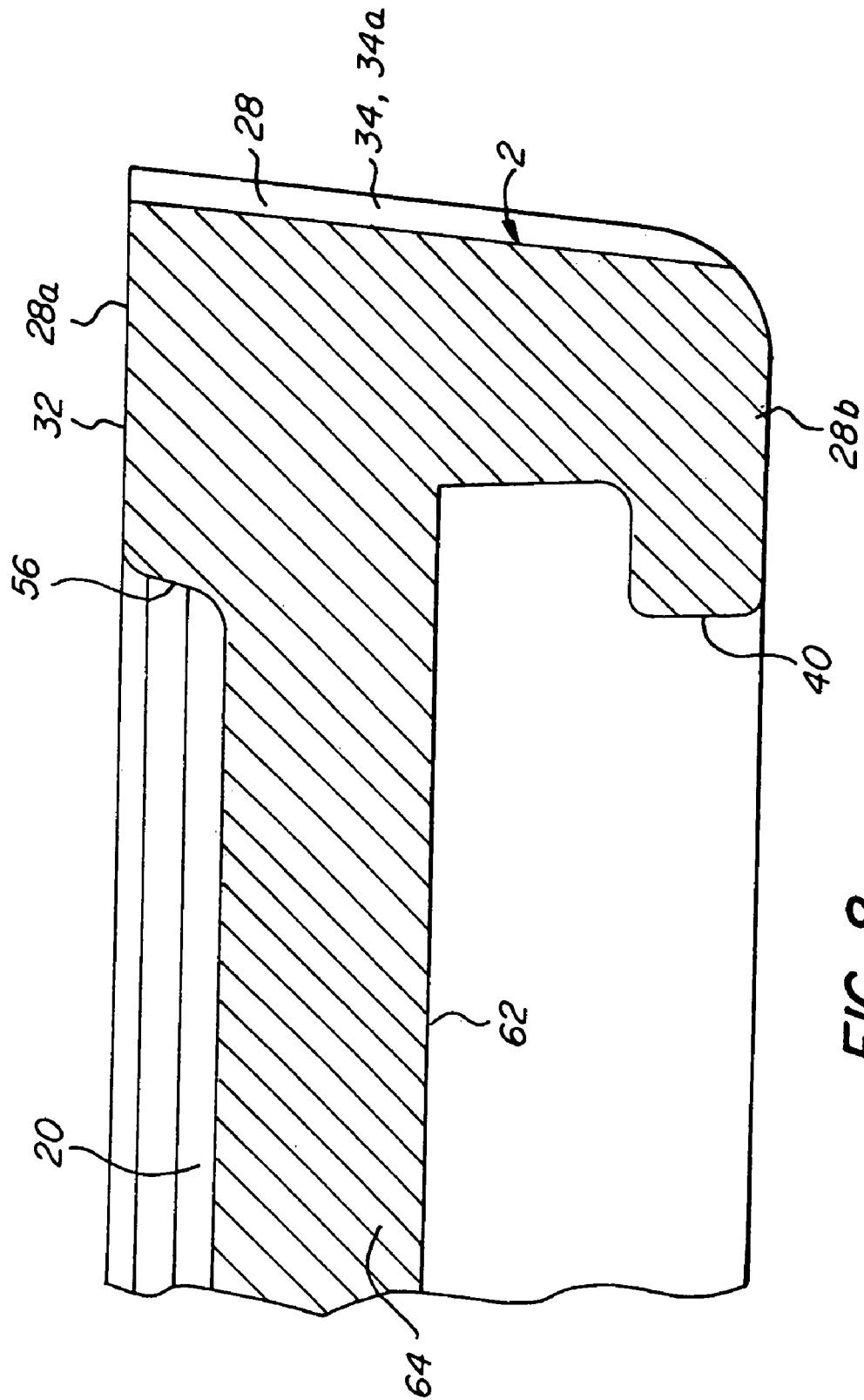
FIG. 8 is an enlarged sectional view of a peripheral portion of the top element drawn to an enlarged scale.
Figure 9:
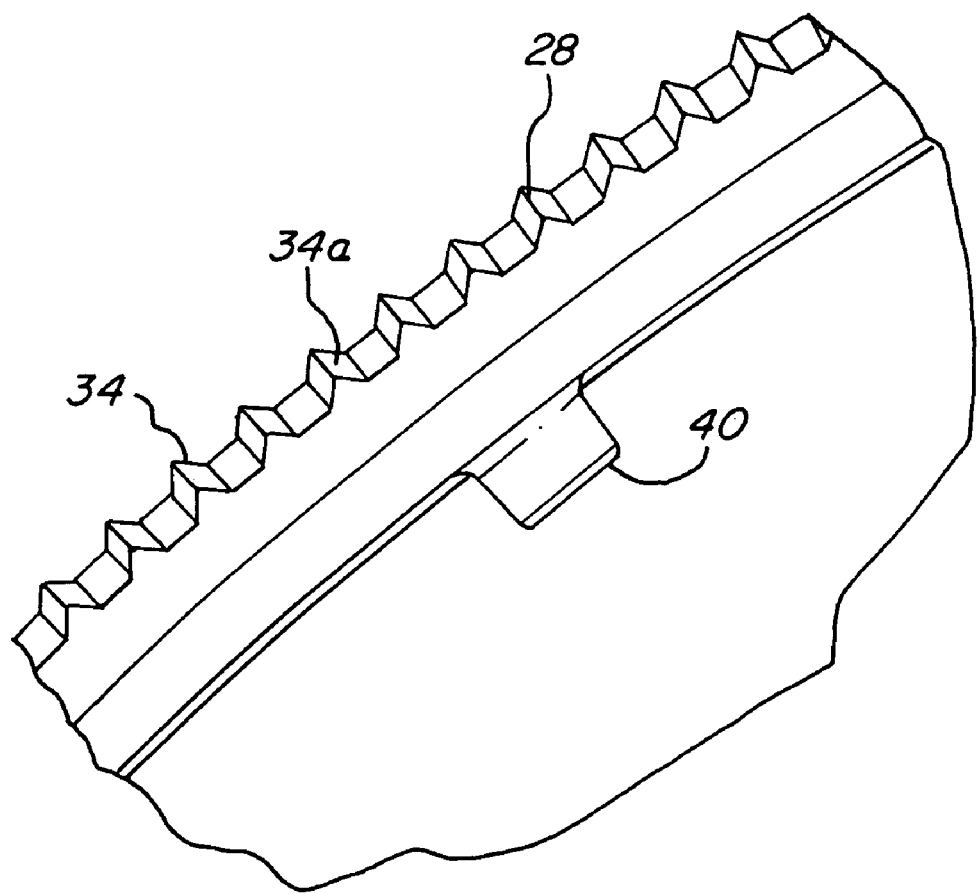
FIG. 9 is a fragmentary perspective view of a portion of the periphery of the top element.
Figure 10:
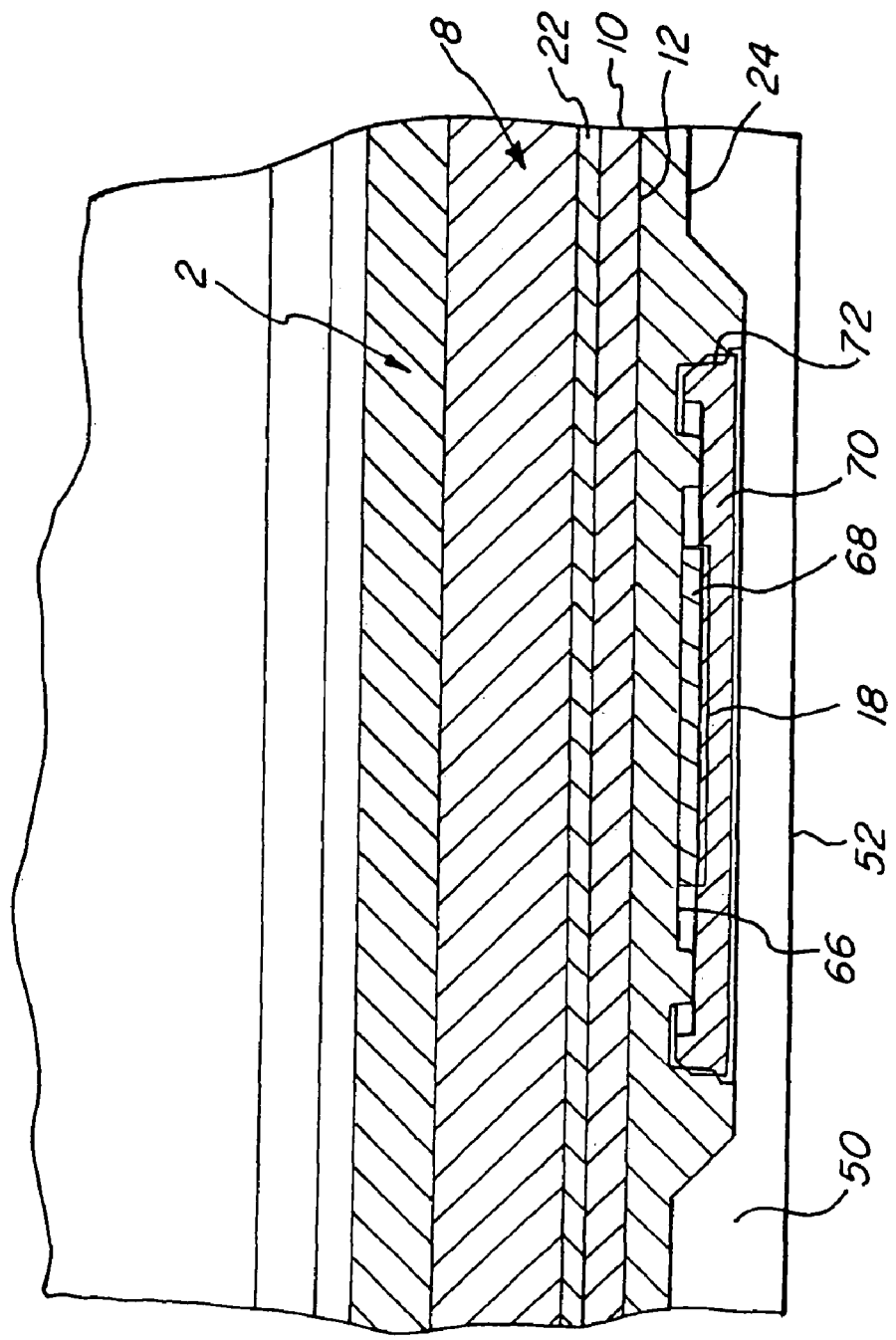
FIG. 10 is an enlarged fragmentary cross sectional view the server.
Figure 11:
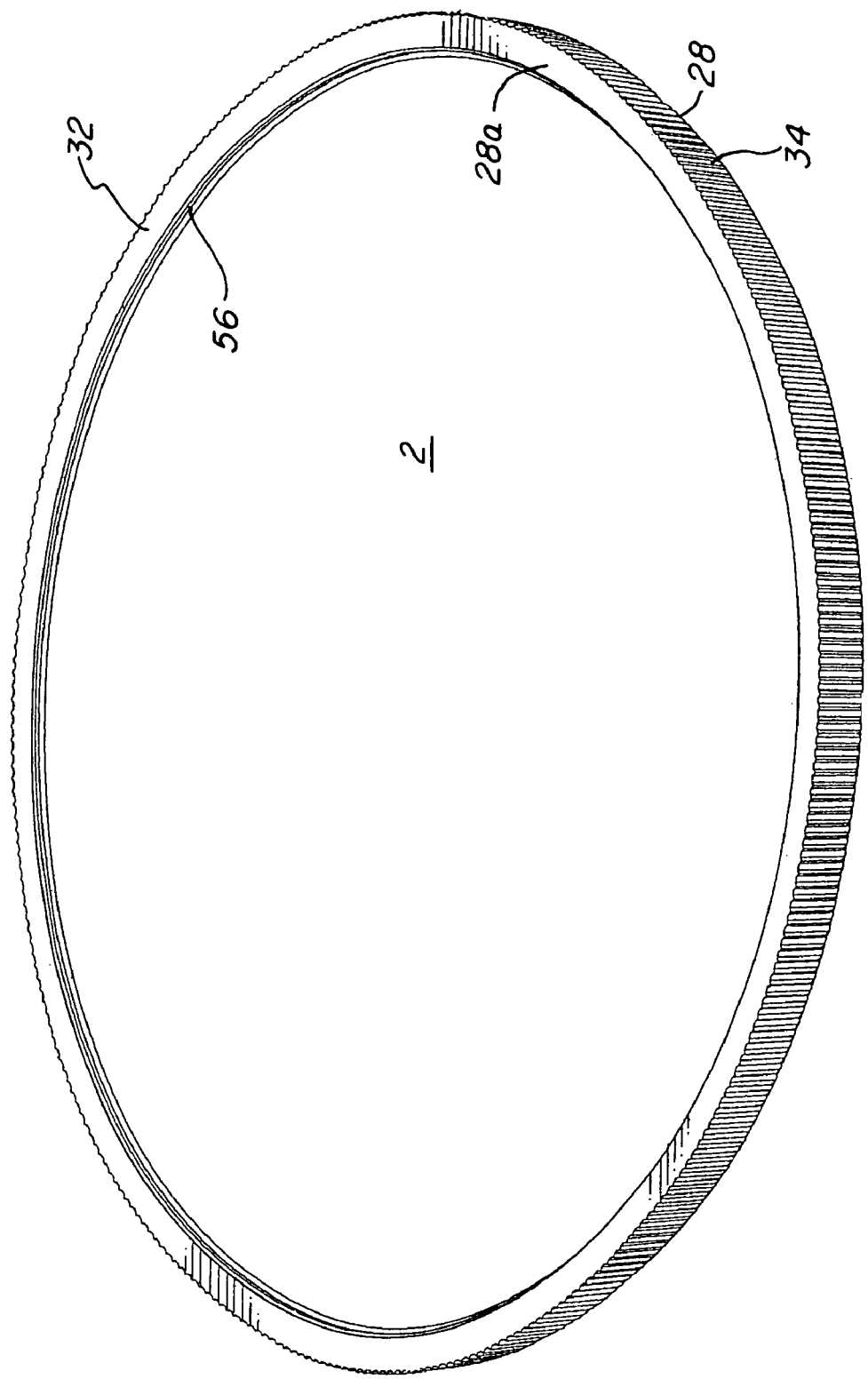
FIG. 11 is a top perspective view of the top element.
Figure 12:
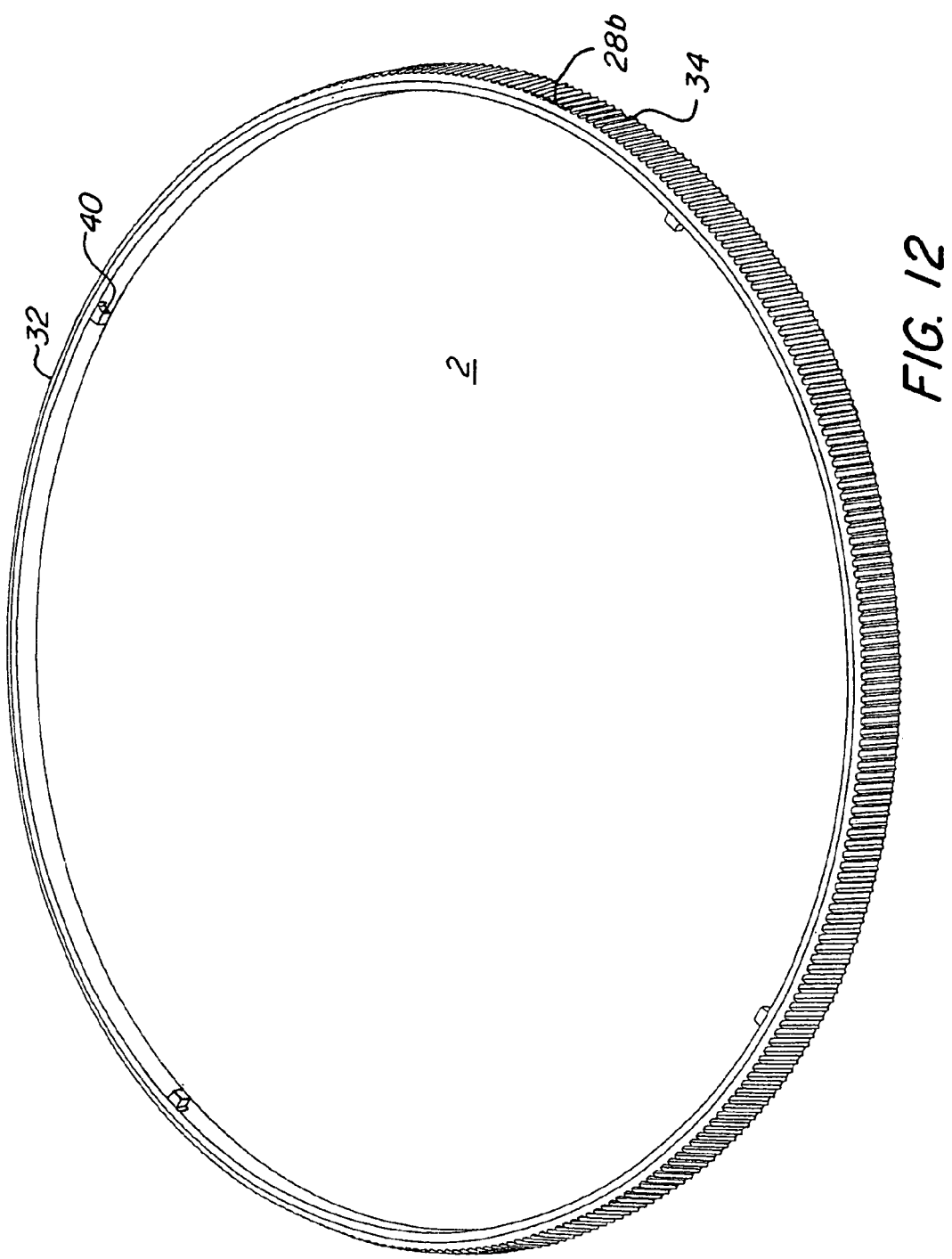
FIG. 12 is a bottom perspective view thereof.
Figure 13:
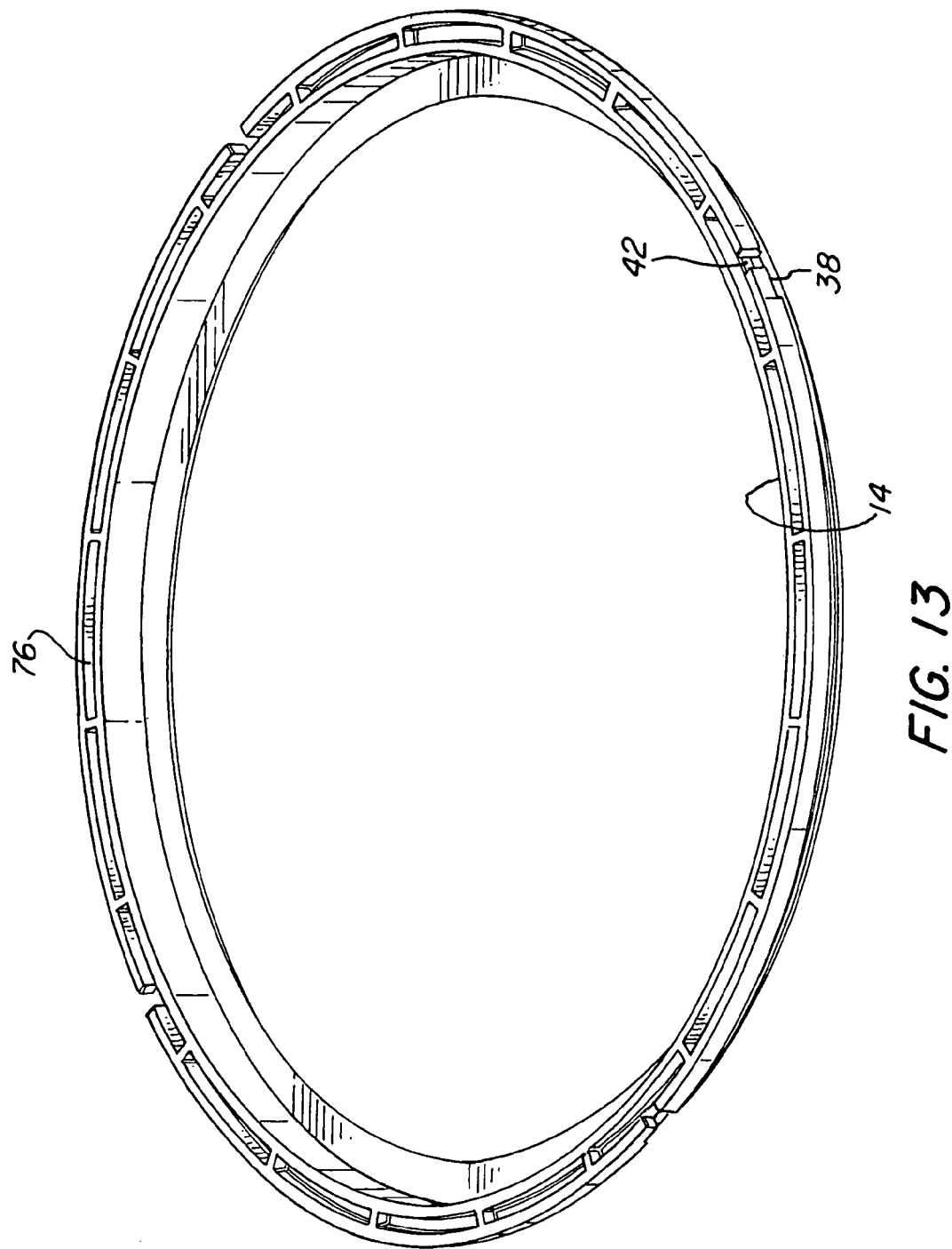
FIG. 13 is a top perspective view of the perimeter ring.

Molten resin is preferably injected at the center of assembly 6 so that the resin fills the mold cavity behind the insulation 10. The preferred injection point is indicated as 18 in FIGS. 4 and 6. A high temperature film 12 is applied over the insulation 10 to protect the insulation from the severe stress caused at the injection point. The film 12 is preferably a high temperature plastic such as polyethylene terephthalate (Mylar) with a typical thickness of 0.004 inch. The film is required to have a significantly higher melt temperature than that of the injected resin and must be capable of surviving the injection process intact to protect the insulation 10. The insulation 10 may be any number of materials such as various insulating felts, woven fiberglass and woven high temperature plastic. Typically the insulation 10 is 0.125 inch thick in the uncompressed state and it may be compressed to as little as 0.040 inch after being over molded in the second cavity. An optional layer of vermiculite 22 having typical thickness of 0.030 inch may be applied between the load 8 and insulation 10 to provide a further layer of separation between the load 8 and the insulation 10. This is to prevent the latent polymer components in the load 8 from flowing into the voids in the insulation. The vermiculite acts as a barrier to improve overall insulation performance.

During the fill cycle, the high pressure of the molten resin pushes the resin from the injection point 18, at the bottom center of molded assembly, radially outwardly along bottom wall 24 and then upwardly over the outer perimeter of the top element 2 and into the side wall 26. It is essential for a strong and complete overmolded seal to be developed at the interface of the molten resin and the perimeter 28 of top element 2. The high temperature of the molten resin re-melts the surface of the perimeter 28. Upon cooling, a "welded" structure is developed at perimeter 28 to provide a strong and reliable hermetic encapsulation of the load 8, vermiculite 22, insulation 10 and film 12.

To increase the surface area and strength of the "weld" interface at perimeter 28, a series of vertical ribs 34 is formed on the circumferential surface 28 of the top element 2. The preferred rib structure is characterized as having an equilateral triangular cross section approximately 0.030 inch at the base. Both surface area and molten resin penetration into the perimeter 28 are enhanced, thus providing increased over mold seam strength and durability.

As the molten resin progresses past the perimeter 28 of top element 2, it flows into the lower portion of the sidewall 26 and envelopes the top portion 28a of perimeter 28. The top and bottom portion of perimeter 28 of part 2 comprises a ring structure 32 that further enhances the overmold melt zone by creating two additional melt planes (28a and 28b, respectively). This geometry further enhances the strength of the final overmolded structure by providing a geometry that effectively locks the molded subassembly 6 in place and creates a sealed structure over three different melt planes (28a and 28b plus vertical melt planes 34a on multiple vertical rib structures 34). Destructive testing has confirmed that this geometry creates a hermetically sealed structure with strength equal to that of the baseline resin, i.e. the same strength as if no weld seam existed.

The main purpose of P-ring 14 is to improve the thermal performance of the base 16 through the selective enhancement of insulation and prevention of heat loss through the bottom and sides of the bottom element 4. Another purpose of the P-ring 14 is to assist in assembling and positioning of the load 8 and insulation 10 inside of top element 2 through creation of a sub-assembly 6 prior to overmolding.

The inside diameter of p-ring 14 is approximately 0.100 inch larger than the outside diameter of the load 8. The subassembly of the load inside the p-ring 14 creates a gap 44a on the order of 0.050 inch between the OD of the load 8 and ID of the P-ring 14. Another air gap 44b is formed by 3-sides of the U-feature 76 in the P-ring 14. The P-ring 14 is also designed with a bottom L-shaped feature 36. When the P-ring 14 is assembled into the first molded element, it can be locked into position through the use of a cam lock feature 38 that engages against tabs 40 on the inside rim of part 2. Clearance slots 42 are provided in P-ring 14 to allow tabs 40 to pass as the P-ring 14 is initially engaged in the element 2. Next, the P-ring 14 is rotated so that tabs 40 compress upwardly against cam lock 38. Thus, the top surface 36a of L-shaped feature 36 presses directly against the film 12 and indirectly against insulation 10 and load 8, and firmly locks the P-ring into position in the subassembly 6. The bottom surface 36b of L-shaped feature 36 is designed with a leading edge angle 58 to direct molten resin flow below and away from the P-ring 14 and into the foot ring 46 formed in the bottom of base 16. During injection into the mold cavity, molten plastic is unable to penetrate between the Mylar film 12 and L-shaped feature 36. The gaps 44a and 44b remain preferentially unfilled. Gaps 44a and 44b create a barrier to heat loss through the perimeter of load 8 and through the sidewall of base 16. Furthermore the thickness of P-ring 14 creates a further barrier to heat transfer through the side wall and bottom of base 16. A preferred embodiment is to fabricate the P-ring 14 from a resin that has lower thermal conductivity than the overmold resin (with resistance to heat flow being inversely proportional to thermal conductivity and proportional to P-ring material thickness). Without the P-ring 14, undesirably high temperatures and associated heat loss are increased in the sidewall and the bottom of base 16. The effect of the P-ring 14 in reducing heat loss has been verified using thermal graphic imaging. Bottom temperatures of base 16 under the perimeter of load 8 were reduced from 160° F. to less than 130° F. through application of the P-ring innovation.

The overmolding process has the benefit of forcing the removal of air that would otherwise be retained inside the base since trapped air causes significant pressure increase as the base is inductively heated. As molten resin fills the cavity starting at the injection point 18, air is displaced by the resin and exhausted to the atmosphere external to the mold cavity through small vent passages that are designed into the mold surfaces.

While overmolding is very effective in displacing trapped air during the injection step, there remains the challenge of air that remains trapped inside the laminated structure of and is inherent to the construction of load 8. When load 8 is inductively heated, this trapped air may expand and move to the radial perimeter and escape load 8. Thermal expansion of solid components of load 8, combined with air expansion inside the load, causes the load to grow radially when the load is inductively heated. A further benefit of gap 44a is to provide 1) room for the radial growth of load 8 and 2) an incremental volume into which air that escapes from load 8 can accumulate. This limits air pressure increase in load 8 that may otherwise cause load 8 to grow in thickness and thereby impart mechanical stresses into and cause top element 2 to crown. As escaped air vents into gap 44a, the ballast air pressure rises significantly. The mechanical structure provided by the P-ring 14 is strong and can easily withstand the pressure increase without undue mechanical stress.

Foot ring 46, conformally formed as a result of the application of p-ring 14, provides the further benefit of creating an enclosed air gap 50 between the bottom surface 48 of the base 16 and the surface 52 upon which the base is resting. The gap 50 creates a further barrier to heat transfer from the bottom of base 16. Foot ring 46 also provides means to stack multiple bases one on top of the other. Without foot ring 46, the lower outside perimeter 54 at bottom of side wall will interfere with inside edge ring 56 and cause unstable stacking. Foot ring 46 solves this by elevating the perimeter 54 above the edge ring 56, thereby providing stable stacking support. Foot ring 46 also allows room for convenient placement of RFID well 66 below insulation 10 and inside the space created by air gap 50.

The high pressure of the overmolding process causes the top surface 60 of the load 8 to be pushed against bottom surface 62 of top element 2. After the assembly is cooled and cured, there is intimate contact and increased contact pressure between the surfaces 60 and 62. This has the preferential effect of increasing thermal conduction and heat transfer from the load 8 through the wall section 64 into the food warming zone above the top surface 20.

The overmolded assembly 4 is removed from the mold cavity upon completion of the cycle. The assembly 4 is a durable, hermetically sealed, over molded assembly that encapsulates the load, vermiculite, insulation, Mylar film and P-ring. The final assembly process step is to install a radio frequency identification (RFID) tag 68 inside the well 66 on which the RFID tag 68 is sealed by adhering the cap 70 over the well 66. The RFID tag 68 is used to provide information to the machine that provides the induction charge into the base 16. The information includes: (1) time duration since last charge and (2) the amount of energy that must be delivered in a full charge. The preferred geometry for the new server includes the encapsulation of the tag 68 in the well 66 through the process of ultrasonically welding the cap 70 over the well 66. This process is accomplished after molding to protect the RFID tag from the heat and pressure of the molding process that could otherwise damage the tag 68. The inside well 66 conforms to the geometry of tag 68 so as to centrally locate tag 68 in the well 66 prior to welding the cap 70. The ultrasonic weld joint 72 is formed using conventional welding technology and provides a very reliable and hermetic seal to protect the tag 68 since the weld joint 72 is impervious to water infiltration from the commercial dish washing cycle.

Figure 14:
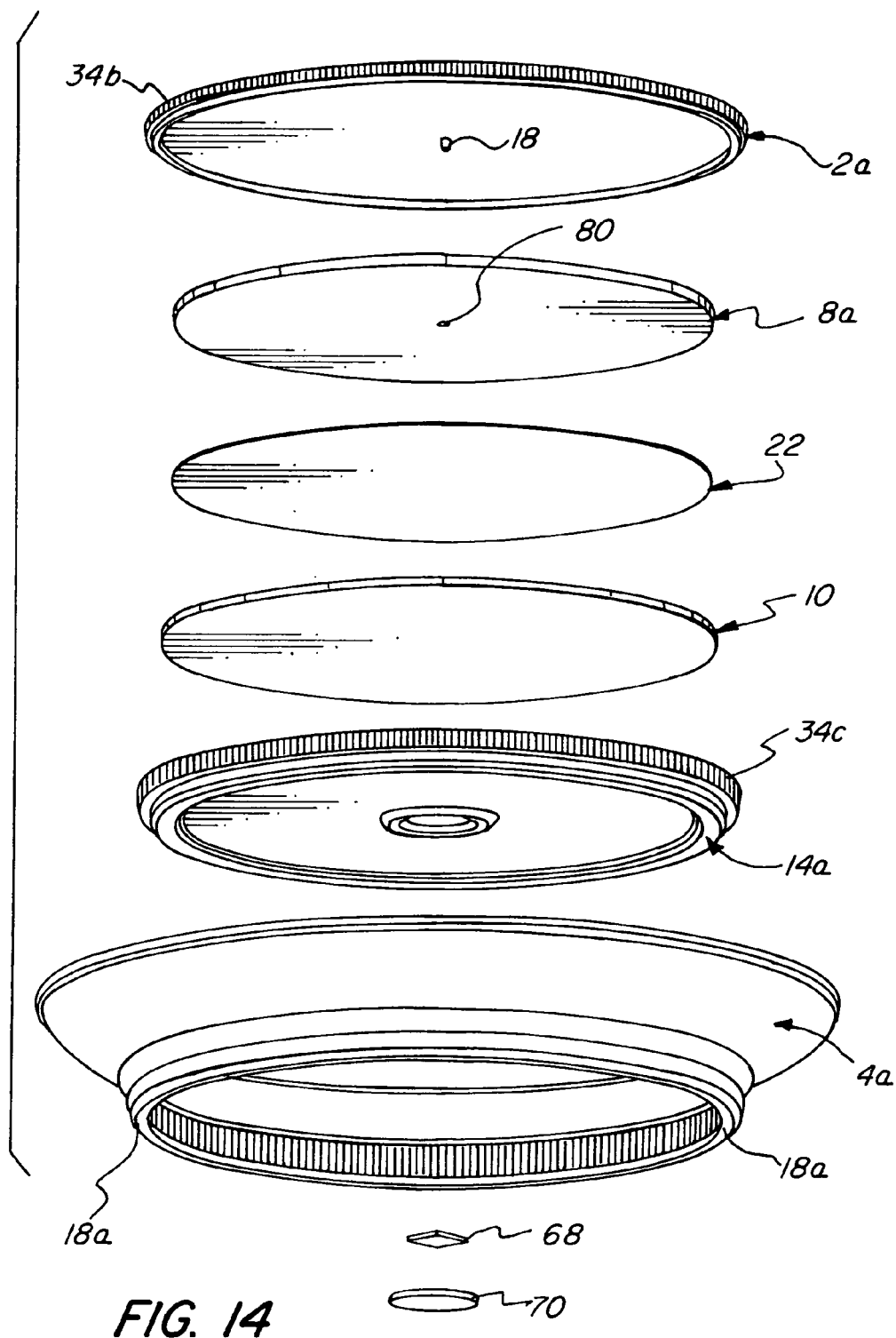
FIG. 14 is an exploded view of an alternate embodiment of a server embodying the present invention.
Figure 15:
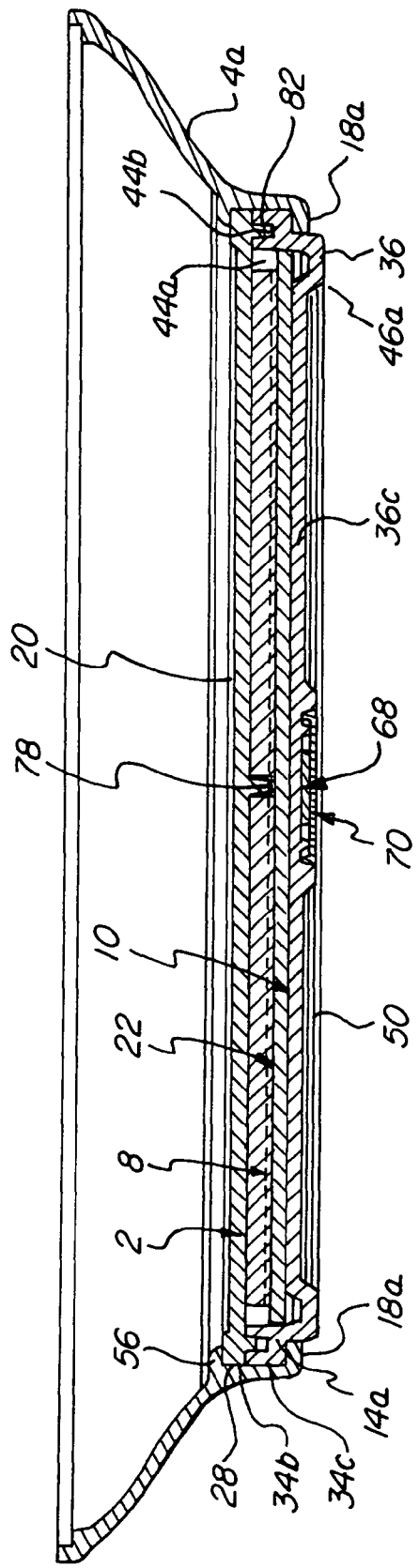
FIG. 15 is a transverse sectional view of said alternate embodiment.

An alternate embodiment of the present invention may be achieved by an assembly in which the bottom L-shaped feature 36 of P-ring 14a is lengthened to form a continuous wall section that spans across the inner diametric section of the P-ring, thus changing its geometry from a ring structure with a hollow center to a disc structure with solid center and as seen in FIGS. 14 and 15. The lengthened wall section 36c of the P-ring is configured to include a foot ring 46a which is integral with the P-ring 14a. The wall section 36c is configured to include the RFID well 66 into which the RFID tag 68 can be placed and then encapsulated by welding cap 70 over the well. Vertical ribs 34c are also added to the exterior perimeter of the P-ring 14 to facilitate a good bond with the bottom element 4 during the overmolding process.

A sub-assembly 6a is formed by press fitting the top element 2a and P-ring element 14a using a using a, mating tongue-and-groove joint 82 provided between the round elements the air gap 44b. Load 8a and vermiculite 22 are encapsulated between elements 2a and 14a to complete the sub-assembly 6a. A boss feature 78 is alternatively provided at the center of top element 2a to mate with center the hole 80 provided in load 8a. This helps to precisely center the load 8 inside the sub-assembly 6a.

The sub-assembly 6a is inserted into the previously described third mold cavity about which molten resin is injected to form alternate embodiment bottom element 4a. In this alternate embodiment the injection point is moved to position 18a located at the exterior radial perimeter of P-ring 14a. Multiple injection points 18a are preferable about the perimeter of P-ring 14a to ensure good filling of the mold cavity. As molten resin enters the injection points 18a, the resin generally flows upwardly about the exterior perimeter of the P-ring 14a and top element 2a, and it encapsulates the top element 2a through the formation of edge ring 56. This alternate embodiment provides the same benefits of internal air pressure management and heat loss reduction through the side walls provided by the formation of air gaps 44a and 44b as previously described. It also provides for the creation of melt planes about the perimeter 28 of top element 2a and P-ring 14a and in combination with vertical ribs 34b and 34c to create a strong, monolithic and hermetically sealed structure. An incrementally attractive benefit of this alternate embodiment arises from the fact that the injection point is moved to 18a, and thereby precluding the compression of insulation 10 due to exposure to the high molding pressure. Thus the insulation effectiveness is increased and heat loss through wall section 36c is greatly reduced.

As is well known, the load may comprise, but is not limited to, a metallic disc, a composite structure consisting of 1) electromagnetically inductive materials such as metal foil, metal particles, and graphite, and 2) materials that undergo phase change in the desired temperature range of 160 F to 200 F such as wax or low melting point plastic such as polyethylene. The composite structure may be homogeneously structured or laminated into a bonded, monolithic assembly.

As is well known, the RFID tag can provide information concerning the inductive energy charge required and the inductive heating history of the server to a microprocessor which can actuate or terminate the operation of an associated charger to bring and/or maintain the server in a desired temperature range.

The P-ring provides a platform upon which the previously molded top element, load, insulating material and film may be supported in the mold cavity prior to and during the overmolding process which encapsulates the various components to provide a monolithic structure. The toothed configuration in the perimeter of the top element strengthens the bond between the perimeter of the top element and the body of the resin which is molded thereover.

Upon removal of the assembly from the mold, the RFID chip or tag is inserted into the cavity molded in the bottom surface and a cap is secured thereover by ultrasonic welding, or a high temperature adhesive.

The plastic resins employed in the molded bottom element 4 must be suitable for withstanding up to three daily hot water wash cycles and to withstand various detergents and rinse agents. Suitable resins include various grades of thermoplastics including polypropylene, nylon, polycarbonate, and polyethylene terephthalate. The resins may be blended with fillers such as glass beads, fibers and talc to enhance durability. Also secondary resins may be added as an alloy or in a blended material to enhance strength and resistance to the hot dish water, detergents and rinse agents. For example a blend of polycarbonate and polybutyl terephthalate (PBT) is deemed a desired alternative to enhance the properties of polycarbonate.

In the preferred embodiment, the P-ring resin should have a melt temperature above the melt temperature of the overmold resin to ensure that the P-ring does not soften and maintains physical integrity during the high temperature and pressures experienced in the overmolding process. For example suitable materials for the P-ring are filled and unfilled grades of polypropylene, polycarbonate, and nylon. Higher end engineering resins such as polysulfone and polyetherimide are also suitable candidates. In the alternate embodiment, the resin used to mold the P-ring and the bottom elements is preferably the same. This is to ensure that the P-ring perimeter surface melts during the overmolding process to create a strong bond between the P-ring and the overmolded bottom element.

Thus, it can be seen that the structure and method of the present invention provides a novel, long-lived server which can maintain food in a dish placed thereon within a desired temperature range for an extended period of time.

Having thus described the invention what is claimed is:

1. An induction heatable server comprising:
   (a) a synthetic resin top element having a depending peripheral flange;
   (b) a synthetic resin bottom element having a bottom wall and a peripheral wall with an upper portion extending over a peripheral portion of said top element and together defining a cavity;
   (c) a heat retentive disc in said cavity, said bottom element being overmolded with synthetic resin about said heat retentive disc and having a generally horizontal flange extending over said peripheral portion of said top element to encapsulate said heat retentive disc and to firmly bond the top and bottom elements into a monolithic structure which precludes moisture penetration into said cavity; and
   (d) a ring member extending about the periphery of said heat retentive disc, said ring member being overmolded and bonded to a peripheral portion of said bottom element.

2. The induction heatable server in accordance with claim 1 wherein there is included a layer of insulation in said cavity below said heat retentive disc.

3. The induction heatable server in accordance with claim 1 wherein said ring member has a body portion and a depending leg portion with an inwardly extending flange at its lower end.

4. The induction heatable server in accordance with claim 3 wherein said top element has a depending peripheral flange abutting the top and outer side surfaces of said ring member.

5. The induction heatable server in accordance with claim 1 wherein there is included an RFID tag sealed in a well in the lower surface of said bottom wall.

6. The induction heatable server in accordance with claim 3 wherein a high temperature polymer film is provided below the insulation to preclude flow of the overmolded resin into said insulation.

7. The induction heatable server in accordance with claim 4 where said ring has an inwardly extending flange on which said insulation and heat retentive disc are seated.

8. The induction heatable server in accordance with claim 1 wherein said top element has a generally vertical circumferential surface with closely spaced vertical ribs extending thereabout.

9. The induction heatable server in accordance with claim 3 wherein said inwardly extending flange extends diametrically across said ring member.

10. The induction heatable server in accordance with claim 9 wherein the said cavity is defined by said ring member, said top element, and said bottom element having a peripheral wall with an upper portion extending over the peripheral portion of said top element.

* * * * *